United States Patent [19]

Curbelo

[11] Patent Number: 5,612,784
[45] Date of Patent: Mar. 18, 1997

[54] DIGITAL SIGNAL PROCESSING TECHNIQUE FOR A FT-IR SPECTROMETER USING MULTIPLE MODULATIONS

[75] Inventor: Raul Curbelo, Lexington, Mass.

[73] Assignee: Bio-Rad Laboratories, Inc., Hercules, Calif.

[21] Appl. No.: 584,217

[22] Filed: Jan. 4, 1996

[51] Int. Cl.$^6$ .................................................. G01B 9/02
[52] U.S. Cl. ...................... 356/346; 356/345; 250/339.08
[58] Field of Search ....................................... 356/345, 346; 250/338.01, 338.05, 339.07, 339.08

[56] References Cited

PUBLICATIONS

M.J. Smith, C.J. Manning, R.A. Palmer and J.L. Chao; "Step Scan Interferometry in the Mid–Infrared With Photothermal Detection," *Applied Spectroscopy*, vol. 42, No. 4, 1988, pp. 546–555.

C.J. Manning and P.R. Griffiths; "Step-Scanning Interferometer With Digital Signal Processing," *Applied Spectroscopy*, vol. 47, No. 9, 1993, pp. 1345–1349.

R. Rubinovitz, J. Seebode and A. Simon; "Step–Scan Technique for middle Infrared Spectroscopy," *FT–IR*, pp. 33–38.

Primary Examiner—Georgia Y. Epps
Assistant Examiner—Robert Kim
Attorney, Agent, or Firm—Townsend and Townsend and Crew LLP

[57] ABSTRACT

By considering a transient signal as merely another signal in a linear, shift-invariant system representing a step-scanning Fourier transform spectrometer, the present invention characterizes the transient signal and then compensates for its effect on the measurement by employing various signal processing techniques. Thus, according to one aspect of the present invention, it provides a method for obtaining the spectrum of the desired signal by subtracting the Fourier transform of the transient signal from the Fourier transform of the composite signal output from the detector (i.e., the signal containing both the desired signal and the transient signal). According to another aspect of the present invention, it provides a method for deriving an estimate of the Fourier transform of the transient signal from the Fourier transform of the composite signal.

6 Claims, 6 Drawing Sheets

DIGITAL SIGNAL PROCESSING TECHNIQUE FOR A FT-IR SPECTROMETER USING MULTIPLE MODULATIONS

BACKGROUND OF THE INVENTION

The present invention relates generally to signal processing, and more specifically to techniques for processing signals recovered from a Fourier transform spectrometer.

A Fourier transform spectrometer typically includes an interferometer into which are directed an infrared beam to be analyzed and a monochromatic beam that provides a position reference. The interferometer has a fixed mirror and a movable mirror. In rapid scanning, the movable mirror is driven at a nominally constant velocity over a portion of its travel; in step scanning, the movable mirror is moved intermittently. Each of the input beams is split at a beam splitter with one portion traveling a path that causes it to reflect from the fixed mirror and another portion traveling a path that causes it to reflect from the movable mirror. The portions of each beam recombine at the beam splitter, and the recombined beams are directed to appropriate detectors.

The optical interference between the two beam portions causes the intensity of the monochromatic beam and each frequency component of the infrared beam to vary as a function of the component's optical frequency and the mirror position. The detector output represents the superposition of these components and, when sampled at regular distance intervals, provides an interferogram whose Fourier transform yields the desired spectrum.

In a rapid scan interferometer, when the mirror is moved at a constant speed, the monochromatic beam provides a nominally sinusoidal reference signal whose zero crossings occur each time the moving mirror travels an additional one quarter of the reference wavelength (i.e., for each half wavelength change of retardation). The data acquisition electronics are triggered on some of these zero crossings to provide regularly sampled values for the interferogram. With the appropriate choice of mirror velocity, the output signal can be made to fall within a convenient range of modulation frequencies, as for example in the audio range.

In a step scan interferometer, the movable mirror is moved from one reference point to the next and then stopped, at which point an intensity measurement is typically made. The sequence is then repeated until the desired interferogram has been acquired.

It is also known in the art to phase modulate the IR signal in a step-scanning interferometer. Phase modulation is a technique wherein a signal is applied to either the fixed or the moving mirror to dither the optical path length at each desired retardation. This is typically by an amount corresponding to ±90° of phase shift of the shortest wavelength in the spectral range of interest (103° is optimum). The phase modulation signal is typically sinusoidal; however, other more complex signals—both periodic and aperiodic— may be suitably employed. The infrared detector signal is passed through a demodulator such as a lock-in amplifier to detect the signal level at the dither frequency. While the shortest wavelength is modulated by almost 100%, the longer wavelengths are modulated to a lesser degree. The output of the lock-in amplifier at a given retardation value provides a measure of the derivative of the interferometer detector signal at that retardation.

A large transient signal is generated when the moving mirror in a step-scanning interferometer moves from one reference location to another. The large transient signal can introduce a substantial error in the measurement. Conceivably, this transient can be disconnected from the demodulator by a switch, but the switch generates another transient when it closes even after the step transient has died down. Hence, the solution employed in the current art is to wait a relatively long time after the mirror has been moved to a new position (i.e., several multiples of the time constant characterizing the lock-in amplifier) to allow the transient to settle before taking a measurement. This approach, however, waste valuable measurement time.

SUMMARY OF THE INVENTION

The present invention provides a technique for reducing the effect of a transient signal in a Fourier transform spectrometer and for allowing a 100% duty cycle for signal measurement in a step-scan interferometer. While the following description discloses a method applied to a step-scan interferometer, the described method can also be applied to reduce the effects of a transient signal in a rapid-scan interferometer.

By considering the transient signal as merely another signal in a linear, shift-invariant system, the present invention characterizes the transient signal and then compensates for its effect on the measurement by employing various signal processing techniques. In particular, the present invention recognizes that the desired signal and the transient signal combine in an additive way. Hence, by the principle of linearity, the relationship between the Fourier transforms of the two signals is also additive. Thus, according to one aspect of the present invention, it provides a method for obtaining the spectrum of the desired signal by subtracting the Fourier transform of the transient signal from the Fourier transform of the composite signal output from the detector (i.e., the signal containing both the desired signal and the transient signal).

According to another aspect of the present invention, it provides a method for deriving an estimate of the Fourier transform of the transient signal from the Fourier transform of the composite signal. In one embodiment, the Fourier transform of the transient signal is estimated by calculating the average value of the Fourier transform of the composite signal over two frequency bands on either side of the phase modulation frequency and then performing a linear interpolation between the average values.

These and other aspects of the present invention will be recognized by those of ordinary skill in the art by reference to the remaining portions of the specification and the attached drawings.

DESCRIPTION OF A PREFERRED EMBODIMENT

Figure 1:
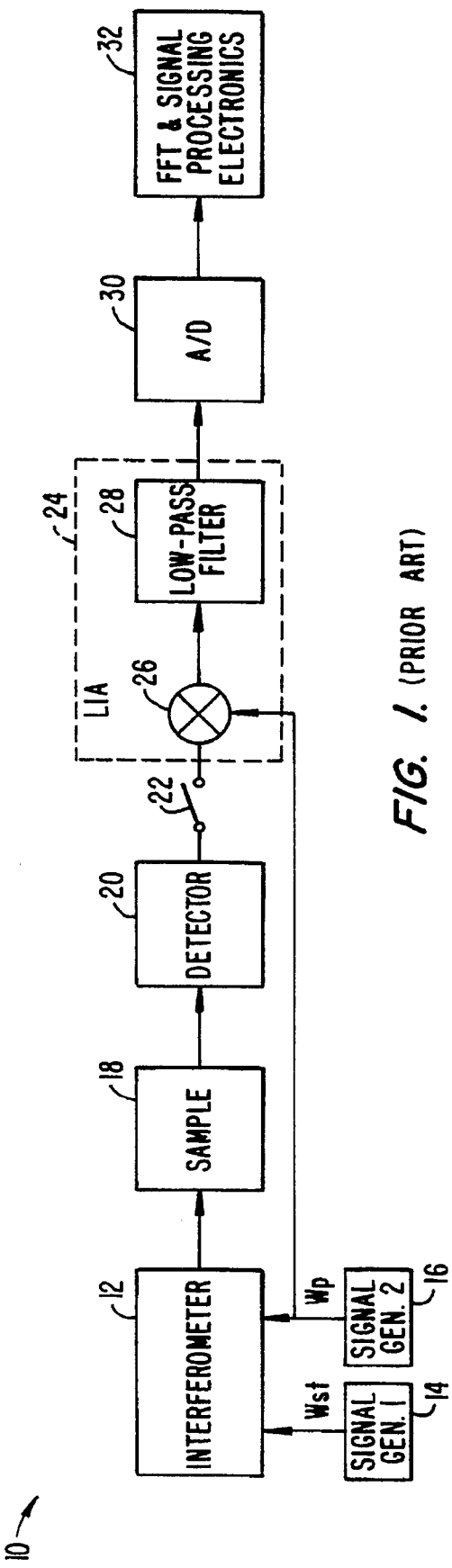
FIG. 1 is a schematic view of a step-scanning Fourier transform spectrometer incorporating a Lock-in Amplifier.

System Overview:

FIG. 1 is a schematic view of a step-scanning Fourier transform spectrometer 10. The drawing is labelled "Prior Art" since the configuration, drawn at this high level, represents known technology.

In a typical embodiment, the spectrometer includes an interferometer 12 and an infrared detector 20 which is used to perform spectral measurements of a sample 18. The underlying purpose of interferometer 12 is to modulate each frequency component of the broadband infrared beam at its own frequency so that when the modulated beam is passed through sample 18, the infrared detector signal provides an interferogram. The interferogram is sampled at fixed increments of mirror displacement, and the digitized data is subjected to a Fourier transform to yield the desired spectrum. Interferometer 12 is typically a Michelson interferometer, however, other types of interferometers may be suitably employed.

A signal generator 14 supplies a step signal, Wst, which is applied to the control electronics of the moving mirror (not shown) to cause the mirror to "step" from one optical retardation to another at the desired step frequency. A signal generator 16 supplies a phase modulation signal, Wp, which may be applied to either the fixed or the moving mirror to cause it to dither about the retardation location.

A lock-in amplifier (LIA) 24 synchronously demodulates the output of infrared detector 20 at the phase modulation frequency to provide a signal corresponding to the derivative of the interferogram at the given retardation. An analog-to-digital convertor 30 digitizes the demodulated signal, and Fast Fourier Transform (FFT) and Signal Processing Electronics 32 calculate the Fourier transform of the digitized signal to yield the desired spectrum. Typically, FFT and Signal Processing Electronics 32 is a digital computer; however, other devices for performing digital data processing may be suitably employed.

Figure 2:
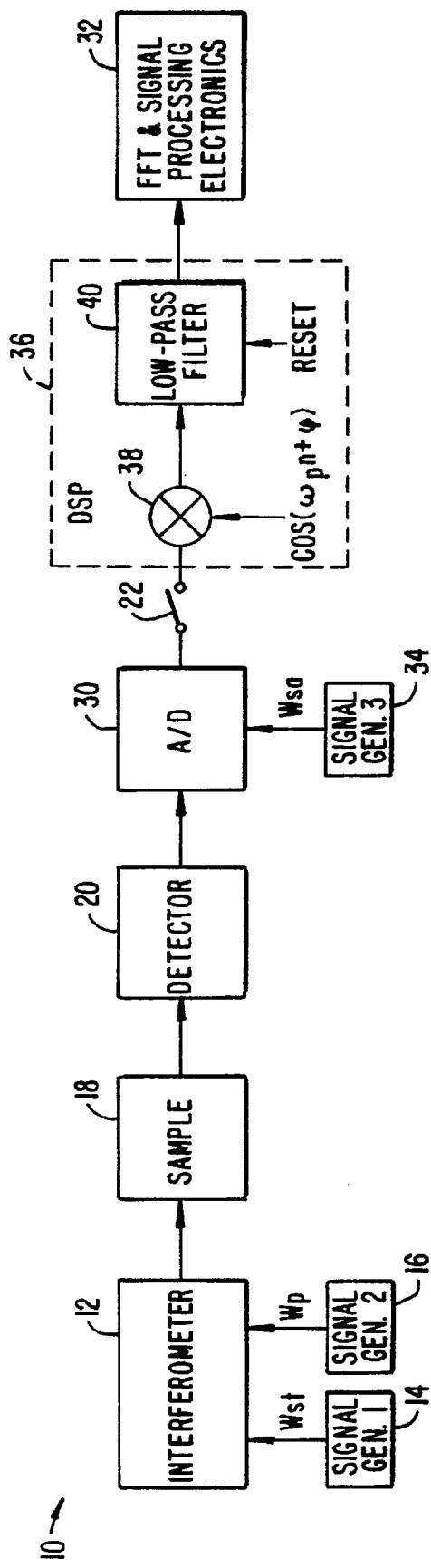
FIG. 2 is a schematic view of a step-scanning Fourier transform spectrometer incorporating a Digital Signal Processor.

FIG. 2 is an alternative embodiment of a step-scanning Fourier transform spectrometer system 10 which incorporates a digital signal processor ("DSP" hereinafter) 36 that emulates LIA 24 shown in FIG. 1. FIG. 2 is also labelled "Prior Art" because the configuration, as drawn at this high level, represents known technology. Signal generator 34 supplies a sampling signal, Wsa, to A/D convertor 30 which causes the output of infrared detector 20 to be sampled at a sufficiently high rate (i.e., greater than or equal to the Nyquist rate).

Figure 3:
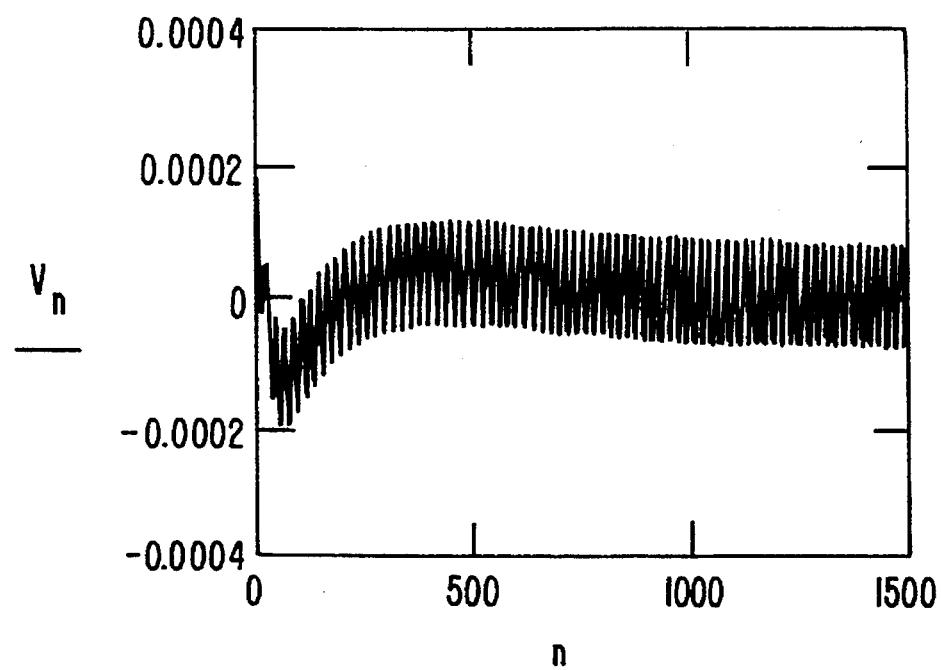
FIG. 3 is a graphical representation of the signal output at the detector for one step of the moving mirror in the step-scanning interferometer.

In both of the systems described above, a large transient signal is generated when the moving mirror in interferometer 12 steps from one optical retardation to another. If the large transient is integrated by the low-pass filter (34 in DSP 36, or 28 in LIA 24), substantial error will be introduced to the measurement. FIG. 3 shows the signal produced at the output of infrared detector 20 for one step of the moving mirror. Conceivably, the transient can be disconnected from the demodulator (i.e., LIA 24 or DSP 36) by a switch 22, but switch 22 generates another transient when it closes even after the step transient has died down.

The solution in the current art is to set a step time that is much longer than the time constant of the LIA (or equivalent DSP). The step time is the amount of time after the mirror has been moved before a measurement can be taken. This approach, however, wastes valuable measurement time which could be used to reduce the overall time required to measured the desired characteristics of the sample or to enhance the signal-to-noise ratio of the measurement (by accumulating data for a longer time).

In the current state of the art for the DSP implementation (i.e., FIG. 2), switch 22 is ideal (i.e., it produces no separate transient signal) and low-pass filter 40 is reset to zero at each step. Therefore, switch 22 may be closed immediately after each step and no waiting is required before taking a measurement. When measurements are taken immediately after ideal switch 22 is closed, however, the signal seen by DSP 36 includes the step transient shown in FIG. 3 for t=0$^+$(i.e., just after t=0). The duration of the step transient is typically on the order of the integration time of an equivalent filter represented by the combined transfer characteristics of sample 18, detector 20 and DSP 36. Thus, the transient still produces considerable error in the measurement. The solution in this case is to make the integration time of the equivalent filter longer to mitigate the influence of the step transient on the measured signal; however, this approach again wastes critical measurement time.

Details of a Preferred Embodiment

The present invention provides very good rejection of the effect of the transient as seen by the DSP demodulator and allows a 100% duty cycle in measurement of a step-scan interferometer. By treating the transient signal as another signal in a linear, shift-invariant system, one can characterize the transient signal and then compensate for it by employing various signal processing techniques. In particular, if the phase modulated signal and the transient signal combine in an additive way, then the principle of linearity dictates that the relationship between the Fourier transforms of the respective signals is also additive.

In the present case, the signal seen by detector 20 at retardation $r_o$ is given by the following:

$$i(r_o) = \int S(v)\sin(2\pi v r_o)dv$$

where $v$ is the optical frequency and $S(v)$ is the spectral distribution of the source seen by the detector. When phase modulation is applied at step $r_0$, we have:

$$i(r) = i(r_0 + d\cos(\omega t)) = i(r_0) + i(r_0) \sum_{n \text{ odd}} J_n(2\pi v d)\cos(n\omega t)$$

where $\omega$ is the phase modulation frequency, t is the time, d is the phase modulation amplitude, and $J_n(x)$ is the n-th order Bessel function of the first kind. Only odd values of n are included in the summation. If we assume that a step occurs at time t=0, then the composite signal at the detector at time t>0 in a system with an ideal sample and a DC-coupled detector having a large bandwidth is given by the following:

$$i(r)_{at\ t>0}=[i(r_0+\Delta)-i(r_0)]+i((r_0+\Delta)+d\cos(\omega t)).$$

where $\Delta$ is the change in retardation due to one step. The difference between the values shown in brackets represents the change in the signal due to one step and corresponds to the transient produced by one step. The non-bracketed component of the above equation corresponds to the phase-modulated signal which we are trying to measure. The above equation shows that the step transient and the phase modulated signal combine in an additive way. Because of the property of linearity, the relationship between the Fourier transform of the step transient and the Fourier transform of the phase-modulated signal is also additive. Therefore, one can eliminate the effect of the step transient on the composite signal by deriving the Fourier transform of the transient signal (i.e., the bracketed component of the equation) and subtracting it from the transform of the composite signal.

Figure 4:
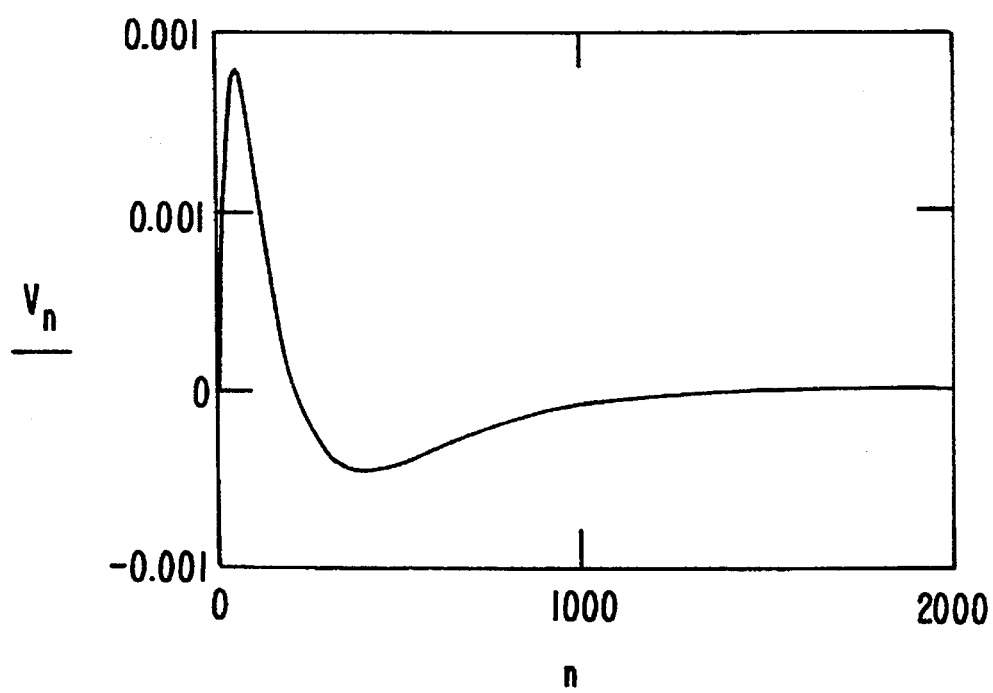
FIG. 4 is a graphical representation of the signal output at the detector for one step of the moving mirror when the phase modulation is not activated.
Figure 5:
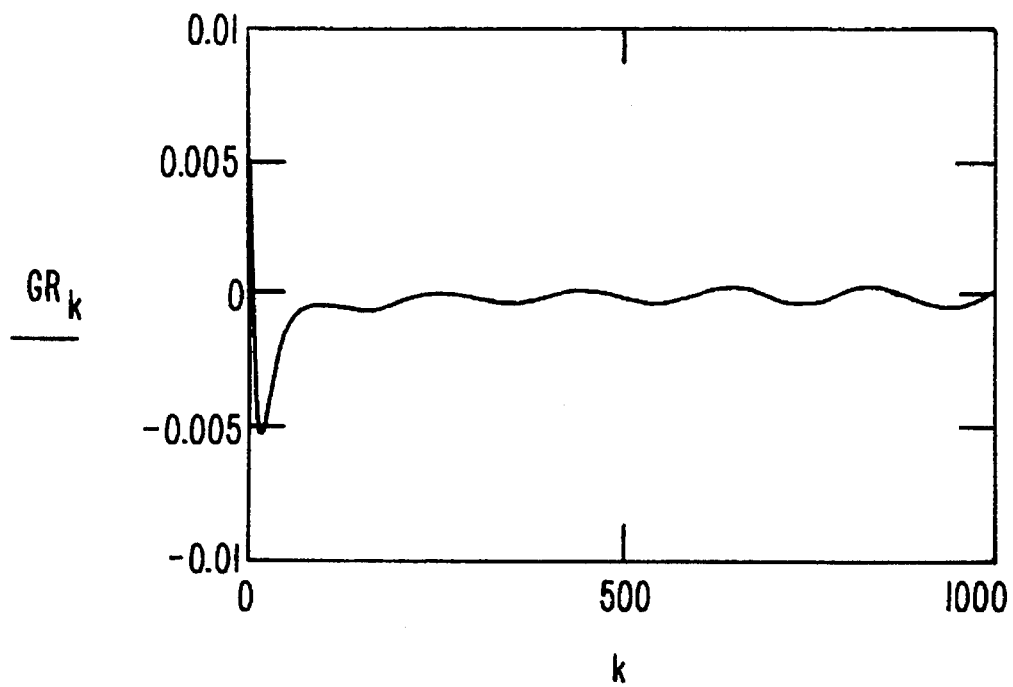
FIG. 5 is a graphical representation of the real part of the Fourier transform of signal output at the detector for one step of the moving mirror when the phase modulation is not activated.
Figure 6:
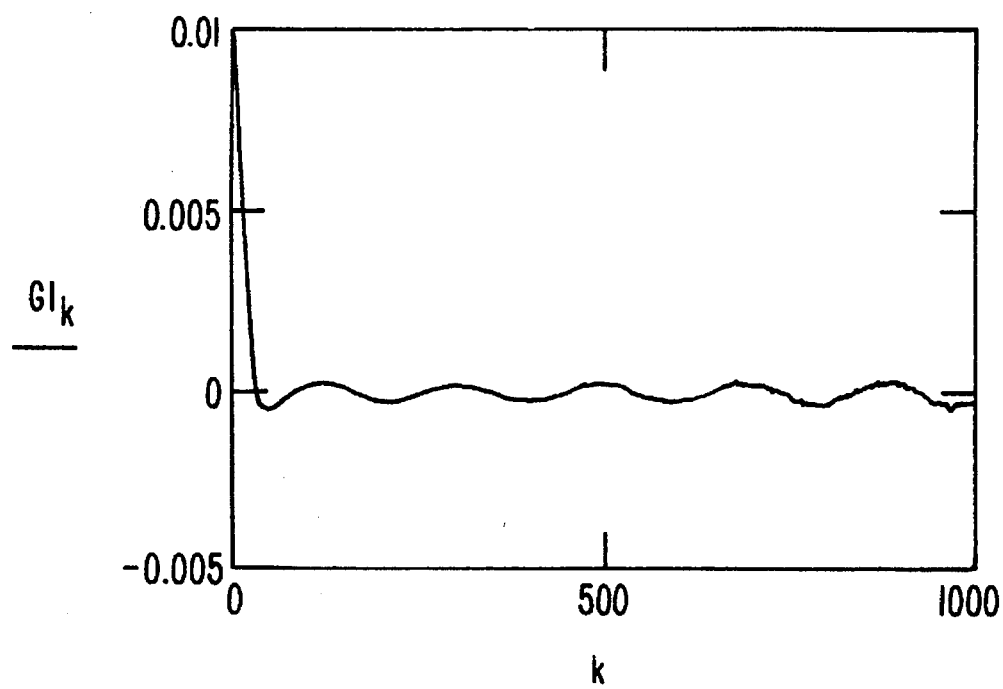
FIG. 6 is a graphical representation of the imaginary part of the Fourier transform of the signal output at the detector for one step of the moving mirror when the phase modulation is not activated.

FIG. 4 shows the output of detector 20 when the phase modulation is eliminated from interferometer 12. All that is left is the step transient produced when the moving mirror translates from one retardation point to another. FIGS. 5 and 6 show the real and imaginary part of the spectrum of the transient, respectively, and show that the transient varies slowly as a function of frequency.

Figure 7:
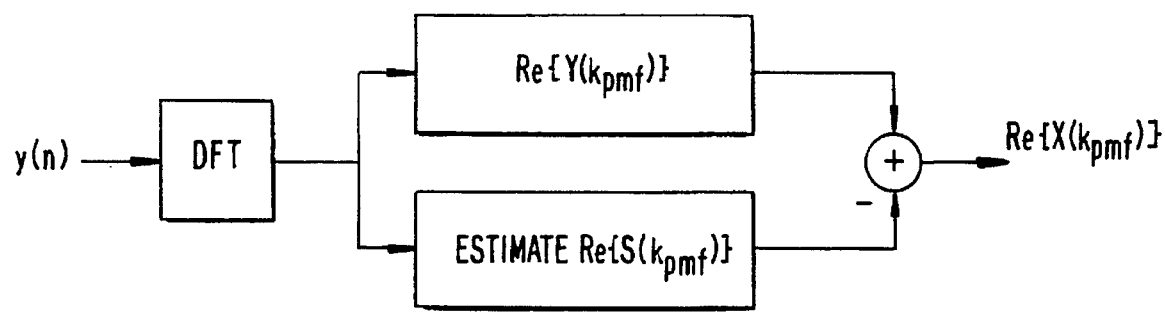
FIG. 7 is a block diagram representation of the method of the present invention for computing the Fourier transform of the phase modulated signal from the composite signal.

The information of interest is the spectrum of the amplitude of the phase modulated signal. Referring to FIG. 7, in a preferred embodiment of the present invention the in-phase component of the desired spectrum is derived by subtracting the real part of the transform of the transient signal from the real part of the transform of the composite signal at each step as follows:

$$Re\{X(k_{pmf})\}=Re\{Y(k_{pmf})\}-Re\{S(k_{pmf})\}$$

where $X(k_{pmf})$ represents the value of the Discrete Fourier Transform (DFT) of the phase modulated signal at the phase modulation frequency, $Y(k_{pmf})$ represents the value of the DFT of the composite signal at the phase-modulation frequency, and $S(k_{pmf})$ represents the value of the DFT of the step transient signal at the phase-modulation frequency. The quadrature component of the desired spectrum is derived in a similar manner by performing the above on the imaginary parts of the described transforms.

Figure 8:
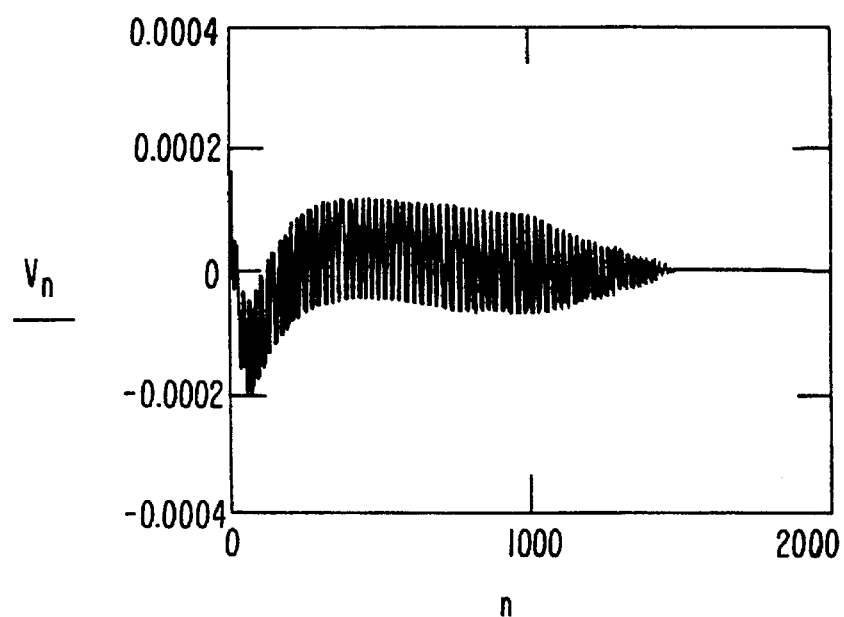
FIG. 8 is a graphical representation of the apodized composite signal.
Figure 9:
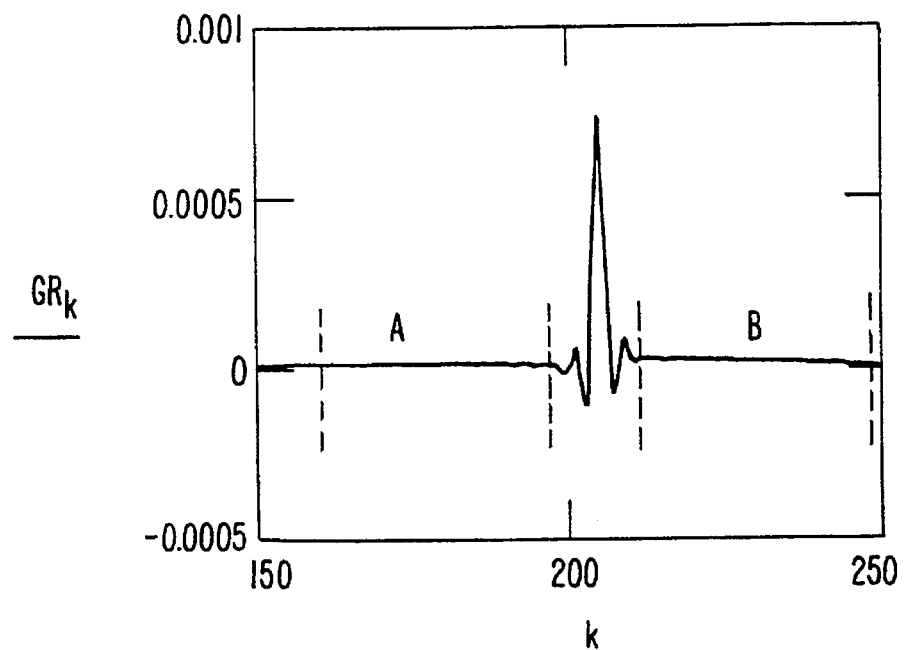
FIG. 9 is a graphical representation of the Fourier transform of the apodized composite signal for a specified frequency regions and an illustration of the method of the present invention for estimating the Fourier transform of the transient signal.

In a preferred embodiment, the DFT of the composite signal, Y(k), is computed by performing a FFT on the signal output from the detector apodized as shown in FIG. 8. The apodization minimizes the amplitude of the sidelobes in the spectral domain. The resulting transform is shown in FIG. 9. The Fourier transform of the composite signal shown in FIG. 9 reveals a principal component of the phase modulated signal located at approximately k=205, with weaker sidebands located approximately at k=200 and k=210. The contribution of the phase modulated signal is negligible outside of this region. In the preferred embodiment, the FFT is calculated using DSP 36; however, a general purpose data processor may also be suitably employed.

As apparent from the above equation, only the value of Y(k) at the phase modulation frequency is of interest. In the preferred embodiment, the real component of this value is determined by calculating the DFT as follows:

$$Re\{Y(k_{pmf})\} = (1/N)\sum_{n=0}^{N-1} y[n]\cos(2\pi k_{pmf}n/N)$$

where y[n] is a sequence representing the composite signal and is of finite duration (i.e., y[n]=0 outside of the interval, $0\leq n\leq N-1$). The imaginary component of $Y(k_{pmf})$ is similarly calculated by replacing the cosine function with the sine function.

If $k_{pmf}$ is not exactly known a priori, then the DFT is calculated in a region about the expected frequency of kpmf with sufficient resolution to identify peak value of Y(k) by the following:

$$Re\{Y(k_{pmf})\}=Re\{\max[Y(k)]_{over\ region}\}.$$

Alternatively, when kpmf is not known with precision, the FFT may be calculated for y[n] over $0\leq n\leq M$, where 2M>>N so that the resulting spectrum provides enough interpolation values to identify the maximum of Y(k). Again, in the preferred embodiment, the described DFT or FFT is calculated using DSP 36; however, a general purpose data processor may also be suitably employed.

Next, in a preferred method of the present invention, the real part of the Fourier transform of the transient signal, $S(k_{pmf})$, is derived from the real part of Fourier transform of the composite signal, Y(k), by 1) averaging the values of the real part of Y(k) in a region of frequency just above the phase modulation frequency where the contribution of the phase modulated signal is negligible, 2) averaging the values of the real part of Y(k) in a region of frequency just below the phase modulation frequency where the contribution of the phase modulated signal is also negligible, and 3) performing a linear interpolation between the two average values. The value of the interpolated segment at the phase modulation frequency is an estimate of the real part of $S(k_{pmf})$ This process is illustrated graphically in FIG. 9. In regions A and B it is assumed that the contribution of the phase modulated signal is negligible and that the contribution of the transient signal predominates. Accordingly, the interpolated values provide a good approximation of the real part of S(k) at the phase-modulation frequency.

Because we know the apodization function used, the envelope of the sidelobes of the phase modulated signal is also known. This information is used to define the best intervals, A and B, over which to estimate the spectrum of the transient by the method described above. Furthermore, because the transform of the transient is slowing varying in frequency, its value is best estimated by averaging the values of the transform over each intervals. This is due to the fact that by averaging m points over each interval, the noise in the estimate of the transform of the transient is correspondingly reduced by a factor $\sqrt{m}$.

In a preferred embodiment of the present invention, the real part of the transform of the step transient is estimated by calculating the DFT as follows:

$$Re\{S(k_{pmf})\} =$$

$$(1/N)\sum_{n=0}^{N-1} y[n]\left(\sum_{h:A}\cos(2\pi kn/N) + \sum_{h:B}\cos(2\pi kn/N)\right)$$

where "k:A" denotes the m-point interval A shown in FIG. 9 and "k:B" denotes the m-point interval B shown in FIG. 9. The imaginary part of the step transient transform is similarly estimated by replacing the cosine functions with sine functions in the foregoing equation. In the preferred embodiment, the above DFT is calculated using DSP 36; however, a general purpose data processor may also be suitably employed.

Figure 10:
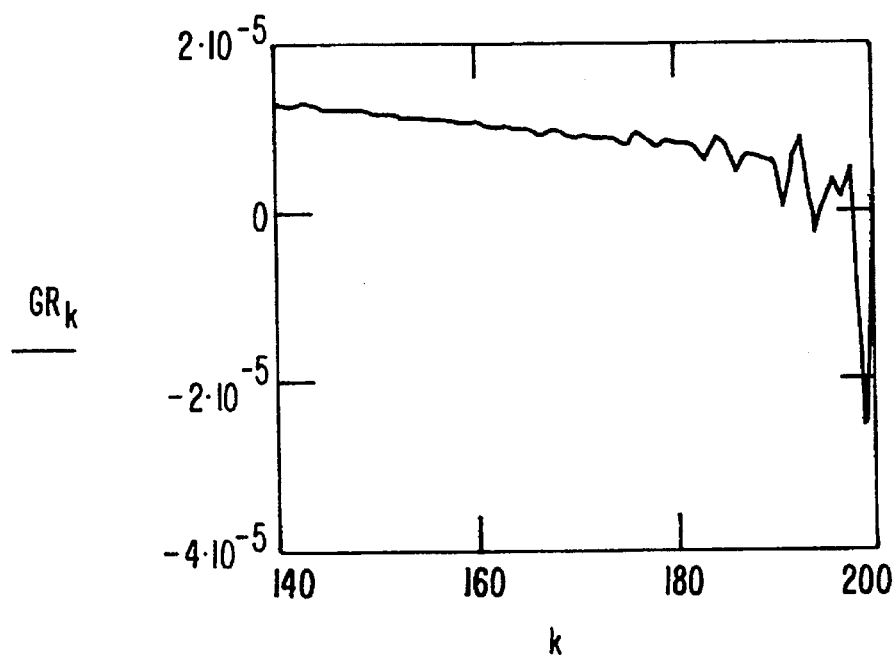
FIG. 10 is a graphical representation of the Fourier transform of the apodized composite signal for a region just below the phase modulation frequency.
Figure 11:
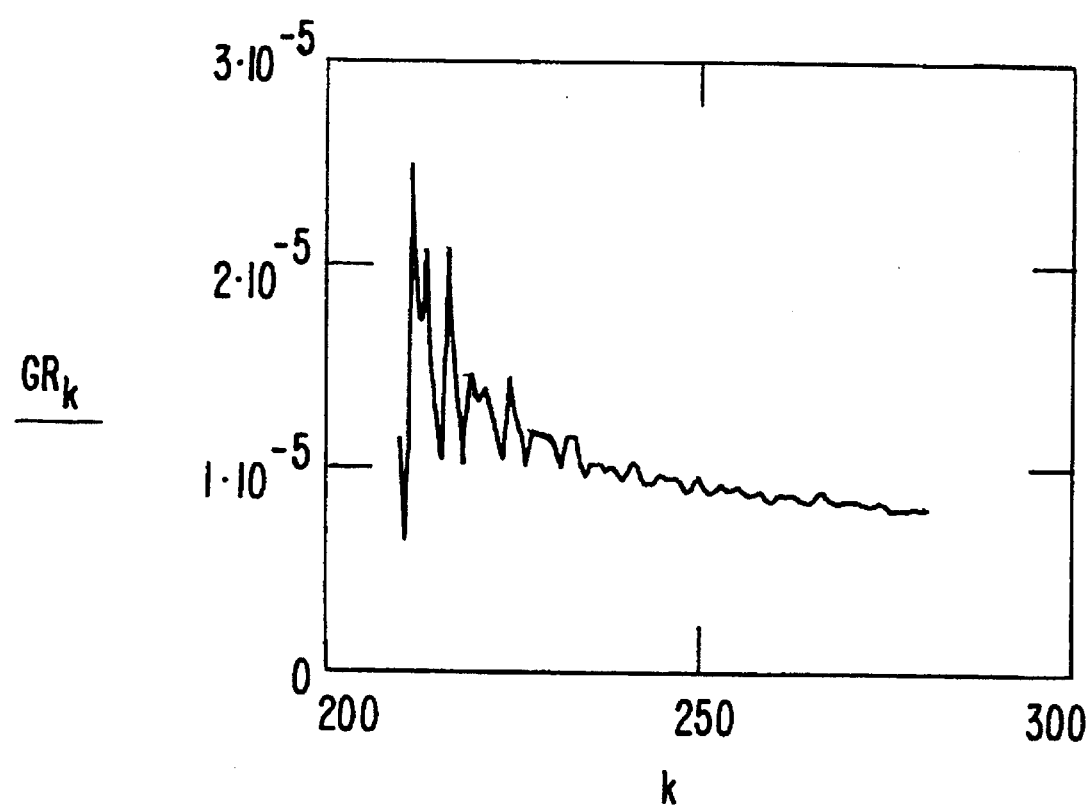
FIG. 11 is a graphical representation of the Fourier transform of the apodized composite signal for a region just above the phase modulation frequency.

Having estimated the real part of $S(k_{pmf})$, it can be subtracted from the transform of real part of the composite signal to produce the value of the in-phase component of the desired signal, $X(k)$, at the phase modulation frequency. By way of example, FIG. 10 shows the real part of the transform of the composite signal computed for a region from k=140 to k=200 just below the phase modulation frequency band, and FIG. 11 shows the real part of the transform of the composite signal, $Y(k)$, computed for a region k=210 to k=270 just above the phase modulation frequency band. The same process is performed using the imaginary part of each transform to derive the value of the quadrature component of $X(k)$ at the phase modulation frequency.

Alternatively, the same process can be implemented using three independent filters for the composite signal. One filter is a narrow bandpass filter to measure the amplitude of the composite signal at its peak (i.e., at the phase modulation frequency). The other two filters are broadband filters tuned to frequency bands on either side of the phase modulation frequency band for measuring the average amplitude of the baseline signal over each band.

The bandwidth of the narrow bandpass filter is matched to the bandwidth of the phase modulated signal. The other two filters have a bandwidth that is wide enough to minimize the noise contribution from the variance in the transform of the step transient, but narrow enough not to violate the assumption that the value of the transform of the step transient in the region between the two filters can be approximated by a linear interpolation. In the preferred embodiment, all of the filters are of the integrate-and-dump type in that they are reset to a zero state after each step of the interferometer.

In a demonstration of the preferred embodiment of the present invention, a gain of a factor of two in measurement time was shown over the prior art. Moreover, the method of the present invention significantly reduced measurement errors over the prior art implementations. Specifically, while an improvement of only a few percent in the measured amplitude of gross features of spectrum was shown, there was as much as a 100% improvement in the measured amplitude of high resolution features of the spectrum.

Conclusion:

In conclusion, it can be seen that the present invention provides a technique for reducing the effect of a transient signal in a Fourier transform spectrometer and for allowing a 100 % duty cycle for signal measurement in a step-scan interferometer.

While the above is a complete description of a preferred embodiment of the invention, various modifications, alternative constructions, and equivalents may be used. For example, instead of separating the foregoing calculations into real and imaginary parts to determine the in-phase and quadrature components of the transform, respectively, the foregoing calculations can be done at once in the complex domain. Accordingly, the above description should not be taken as limiting the scope of the invention which is defined by the appended claims.

What is claimed is:

1. In a Fourier transform spectrometer comprising an interferometer, a detector, and a digital signal processor, a method for processing the signal generated by said Fourier transform spectrometer comprising the steps of:

receiving, at said digital signal processor, a composite signal from said detector of said spectrometer, wherein said composite signal corresponds to a measurement from said interferometer and comprises a data signal and a transient signal;

calculating a transform representation of said composite signal;

estimating a transform representation of said transient signal, wherein said step of estimating includes;

identifying, from said transform representation of said composite signal, a first frequency band over which said data signal predominates;

identifying, from said transform representation of said composite signal, a second frequency band over which said transient signal predominates, said second frequency band being adjacent to and below said first frequency band;

identifying, from said transform representation of said composite signal, a third frequency band over which said transient signal predominates, said third frequency band being adjacent to and above said first frequency band;

deriving a first estimate of said transform representation of said transient signal in said second frequency band by averaging a plurality of first values of said transform representation of said composite signal in said second frequency band;

deriving a second estimate of said transform representation of said transient signal in said third frequency band by averaging a plurality of second values of said transform representation of said composite signal in said third frequency band;

deriving plurality of third values each corresponding to an estimate of said transform representation of said transient signal in said first frequency band by interpolating between said first estimate and said second estimate; and subtracting said transform representation of said transient signal from said transform representation of said composite signal to provide a modified measurement such that an effect of said transient signal on said measurement is reduced.

2. The method of claim 1, wherein Fourier transform spectrometer is a step-scanning interferometer and said transient signal comprises a step signal which results when a movable mirror comprised in said interferometer is moved from a first reference location to a second reference location.

3. The method of claim 1, wherein said transient signal comprises a switch signal which results when a switch in a signal path of said Fourier transform spectrometer is first closed.

4. The method of claim 1, wherein said plurality of first values correspond to a real part of said transform representation of said composite signal over said second frequency band, wherein said plurality of second values correspond to a real part of said transform representation of said composite signal over said third frequency band, and wherein said plurality of third values corresponds to a real part of said estimate of said transform representation of said transient signal.

5. The method of claim 1, wherein said plurality of first values correspond to an imaginary part of said transform representation of said composite signal over said second frequency band, wherein said plurality of second values correspond to an imaginary part of said transform representation of said composite signal over said third frequency band, and wherein said plurality of third values corresponds to an imaginary part of said estimate of said transform representation of said transient signal.

6. In a Fourier transform spectrometer comprising an interferometer, a detector, and a digital signal processor, a method for processing a composite signal generated by said Fourier transform spectrometer, said composite signal including a phase modulated signal and a transient signal, said method comprising the steps of:

receiving, at said digital signal processor, said composite signal from said detector of said interferometer, said composite signal corresponding to a measurement from said interferometer;

applying a first bandpass filter to said composite signal to measure a first value of a transform representation of said composite signal, said bandpass filter having a bandwidth matched to a bandwidth of said phase modulated signal and being tuned to a phase modulation frequency;

applying a second bandpass filter to said composite signal for measuring a second value of said transform representation of said composite signal said second bandpass filter having a broad bandwidth and being tuned to a first frequency band adjacent to and below said phase modulation frequency;

applying a third bandpass filter to said composite signal for measuring a third value of said transform representation of said composite signal, said third bandpass filter having a broad bandwidth and being tuned to a second frequency band adjacent to and above said phase modulation frequency;

deriving an estimate of a transform of said transient signal at said phase modulation frequency by interpolating between said second value and said third value; and subtracting said estimate from said first value to provide a modified measurement such that an effect of said transient signal on said measurement is reduced.

* * * * *